United States Patent Office 2,818,462
Patented Dec. 31, 1957

2,818,462
ELECTRODE FOR ELECTRIC BATTERY

Frank Solomon, Jackson Heights, N. Y., assignor to Yardney International Corp., New York, N. Y., a corporation of New York No Drawing. Original application July 15, 1950, Serial No. 174,076. Divided and this application November 7, 1952, Serial No. 319,406

1 Claim. (Cl. 136—21)

This application is a division of application Ser. No. 174,076, filed by me jointly with Martin E. Kagan on July 15, 1950.

The present invention relates to electric storage batteries particularly of the type wherein one electrode or group of electrodes consists of silver, the other electrode or group of electrodes being preferably made of zinc oxide which during the charging of the battery is reduced to metallic zinc.

It is known to increase the effective surfaces of such electrodes by forming them, or at least the major part thereof, of finely comminuted rather than solid material, and to provide suitable means for holding the electrode particles together; thus there has been disclosed in U. S. Patent No. 2,594,711, a battery of this description wherein each positive electrode consisting essentially of silver (or silver peroxide when charged), and each negative electrode, consisting essentially of zinc (or zinc oxide when discharged) is composed of powdered active material inserted in a bag or envelope which is immersed in an alkaline electrolyte and is sufficiently porous to enable the passage of liquid electrolyte but tight enough to prevent undesirable migration of particles of the active material.

An object of the present invention is to provide an electrode for batteries of this character which is more compact than the type of electrode described above without, however, sacrificing the advantage of large effective surface inherent in an electrode in powder form.

Another object of this invention is to provide an electrode of the character set forth which, while occupying less space than does a powdered electrode of the same weight, is more rugged and mechanically more stable than the latter and will not be subject to objectionable deformation or disintegration, even when made of very reduced thickness, either during handling and assembly into a battery or when placed under pressure in the finished cell, e. g. in the manner described in U. S. Patent No. 2,594,709.

Still another object is to provide an electrode of large effective surface wherein, however, any possibility of short circuits due to migration of loose particles of electrochemically active material is precluded.

Yet a further object of the invention is to provide a method of making an electrode of this description in such manner as substantially to eliminate all impurities, thereby improving the performance of a battery containing such electrode.

In accordance with this invention the active electrode material is silver of firm yet spongy and coherent character and is produced as follows:

Silver powder is compressed into flat, plate-like form. The compacted mass is thereupon placed between two flat blocks of preferably ceramic material, capable of withstanding elevated temperatures, whereupon the whole assembly is placed in an oven at such temperature and for such length of time as to cause sintering of the comminuted silver. Temperatures ranging from 650° to 800° C. and baking times of 1 hour or less have been found suitable. This operation converts the powder into a body of spongy yet mechanically rigid character. Also, it has been found that objectionable impurities originally present in the silver are burned out in the sintering process, whereby the performance of a battery incorporating such electrode is greatly improved.

I claim:

An electrode for electric batteries, comprising a self-supporting, flat, plate-like body consisting throughout its thickness of comminuted material, said comminuted material being constituted, at least to a major extent, by sintered particles of metallic silver.

No references cited.